United States Patent [19]

Schaefer et al.

[11] Patent Number: 4,714,405
[45] Date of Patent: Dec. 22, 1987

[54] CENTRIFUGAL PUMP

[75] Inventors: John G. Schaefer; Jerome K. Aarestad; Terry L. Whitesel, all of Rockford, Ill.

[73] Assignee: Sundstrand Corporation, Rockford, Ill.

[21] Appl. No.: 906,676

[22] Filed: Sep. 11, 1986

Related U.S. Application Data

[63] Continuation of Ser. No. 502,104, Jun. 8, 1983, abandoned.

[51] Int. Cl.$^4$ .............................................. F01D 25/32
[52] U.S. Cl. ................... 415/169 R; 415/176; 417/366
[58] Field of Search ............. 415/104, 106, 107, 110, 415/111, 112, 113, 168, 169 R, 169 A, 176, 199.6; 417/360, 366, 203; 60/39.08

[56] References Cited

U.S. PATENT DOCUMENTS

| 1,853,973 | 4/1932 | Hoffmann | 415/169 |
|---|---|---|---|
| 2,704,516 | 3/1955 | Mock et al. | 417/366 |
| 2,835,203 | 5/1958 | Cliborn | 415/169 |
| 3,031,973 | 5/1962 | Kramer | 415/104 |
| 3,128,713 | 4/1964 | Nechine | 415/112 |
| 3,146,635 | 9/1964 | Brose | 415/106 |
| 3,288,073 | 11/1962 | Pezzillo | 415/176 |
| 3,402,671 | 9/1968 | Wilfley et al. | 415/168 |
| 3,652,186 | 3/1972 | Carter | 415/110 |
| 3,677,659 | 7/1972 | Williams | 415/111 |
| 3,734,649 | 5/1973 | Sandy, Jr. | 417/366 |
| 4,034,560 | 7/1977 | Chute et al. | 415/142 |

FOREIGN PATENT DOCUMENTS

| 514697 | 12/1930 | Fed. Rep. of Germany | 417/366 |
|---|---|---|---|
| 2541629 | 3/1977 | Fed. Rep. of Germany | 415/169 R |
| 698613 | 2/1931 | France | 415/106 |

Primary Examiner—Robert E. Garrett
Assistant Examiner—John T. Kwon
Attorney, Agent, or Firm—Wood, Dalton, Phillips, Mason & Rowe

[57] ABSTRACT

A centrifugal pump has a casing with an impeller cavity in which a shrouded impeller is mounted and with front and rear labyrinth seals associated one with each of the front and rear shrouds of the impeller and located near the inner ends of the shrouds. An additional seal is positioned inwardly of the rear labyrinth seal to substantially seal a space behind the innermost part of the rear shroud and a pump structure is mounted on the impeller to the rear of the rear shroud for pumping fluid from the substantially sealed space to the entrance of a volute surrounding the impeller. The impeller shaft has a front thrust bearing coacting with a bearing surface, with fluid passing therebetween for lubrication and with the flow of the fluid being controlled to a minimal amount by a force imbalance on the impeller shaft created by location of the front and rear labyrinth seals at different distances from the axis of rotation of the impeller whereby pressure forces acting at the rear of the impeller urge the impeller shaft in a forward direction.

2 Claims, 3 Drawing Figures

CENTRIFUGAL PUMP

This application is a continuation of application Ser. No. 502,104, filed June 8, 1983, now abandoned.

DESCRIPTION

1. Technical Field

This invention pertains to a centrifugal pump and, more particularly, to a fluid system such as an aircraft engine fuel system wherein the fluid is engine fuel using a centrifugal pump as a boost stage. The fluid system returns hot fluid to the centrifugal pump for lubrication of various parts, with the major part of the lubricating fluid being isolated from low pressure fluid areas within the pump for improved net positive suction head performance of the centrifugal pump.

2. Background Art

In engine fuel systems for aircraft, it is known to utilize a two-stage pump for delivering fuel to a fuel control. A first boost stage is provided by a centrifugal pump which delivers fluid to a second stage fixed displacement pump, such as a gear pump, with the fuel delivered under pressure from the latter pump to the fuel control. The components are normally sized to deliver adequate fuel under maximum operating conditions. Any fuel not demanded by the fuel control is returned as bypass flow from the fuel control to a location between the centrifugal boost stage and the second stage fixed displacement pump. Some heat is generated within this fuel; however, this is minimal under maximum operating conditions.

When the aircraft engine is idling or set in a descending altitude condition, the total fuel required by the engine is considerably less and there is a resulting high bypass flow from the fuel control, with a rise in temperature of the fuel. The temperature of the fuel may reach 300° F. Under these same conditions, there is a substantial pressure rise within the centrifugal pump boost stage which promotes added recirculation flow within the centrifugal pump which directs hot fuel toward the inlet of the centrifugal pump.

In prior art centrifugal pumps, high temperature fluid could enter into areas of low pressure within the centrifugal pump, with resulting vaporization of the fluid which adversely affects the operation of the centrifugal pump. A centrifugal pump using conventional centrifugal labyrinth seals to minimize bearing thrust loads requires the venting of a space behind the rear shroud of the impeller. This venting has been to a low pressure area, such as the inlet of the impeller, as by openings through the rear shroud of the impeller. Another way of accomplishing this without openings through the rear shroud of the impeller is shown in the Williams U.S. Pat. No. 3,677,659 wherein a leakage space behind the rear shroud is connected through passages to the inlet of the inducer associated with the impeller. However, this is still returning the fluid to a low pressure area with resultant possible vaporization of the fluid and degradation in the operation of the centrifugal pump.

DISCLOSURE OF THE INVENTION

A primary feature of the invention is to provide a centrifugal pump having a casing with a shrouded impeller located within an impeller cavity opening to a volute entrance and having pumping means communicating with a substantially sealed space behind the inner portion of the rear shroud for pumping fluid from the space to the volute entrance. This avoids the delivery of hot fluid to a low pressure inlet area. More particularly, a pair of labyrinth seals are associated with the front and rear shrouds of the impeller and with leakage past the labyrinth seal associated with the rear shroud flowing to the sealed space behind the innermost portion of the rear shroud. A shrouded secondary pump integral with the rear shroud of the impeller pumps the fluid from the space to the volute entrance. The space is sealed by a rotary shaft seal which precludes high temperature thrust and journal bearing lubrication flows entering the space and being delivered to pump discharge. This aids in holding down the temperature of front labyrinth seal leakage to a low pressure inlet area.

Another feature of the invention is the use of a planar thrust bearing adjacent an end of the impeller shaft for the impeller of a centrifugal pump which coacts with the planar portion of a journal bearng and with lubrication provided by fuel returning to the centrifugal pump. Front and rear labyrinth seals associated with the shrouds of the impeller are located at different distances from the axis of rotation of the impeller shaft to provide a pressure force giving a minimal forward thrust to urge the thrust bearing towards the journal bearing and control bearing leakage which flows to a low pressure area at the inlet of an inducer section of the centrifugal pump.

BEST MODE FOR CARRYING OUT THE INVENTION

Figure 1:
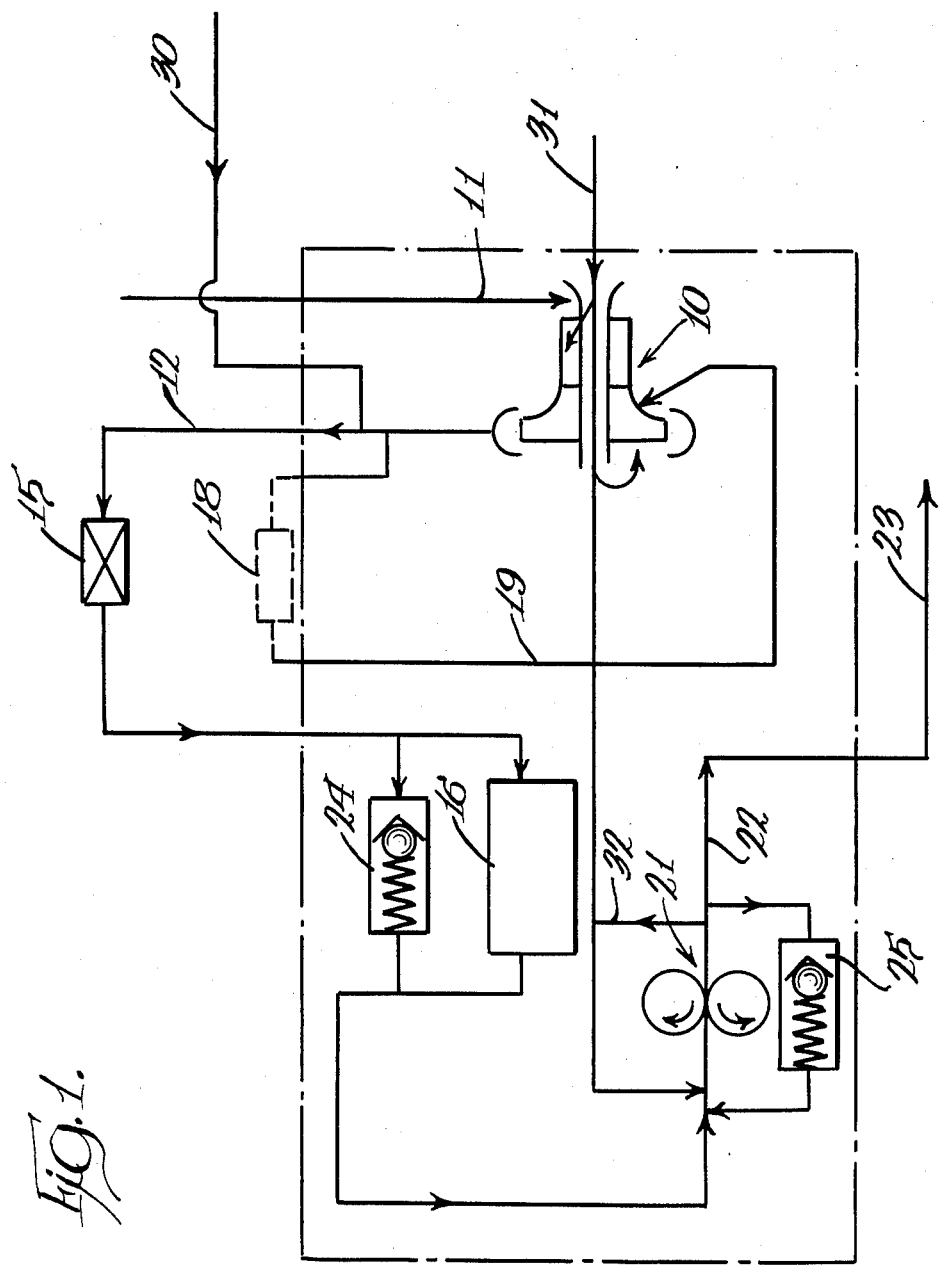
FIG. 1 is a schematic of an engine fuel control system.

Referring to FIG. 1, an engine fuel control system has a centrifugal pump first boost stage, indicated generally at 10, which is supplied with fuel through an inlet line 11. The fuel has its pressure increased in the first boost stage and flows through a fluid line 12 having a cooler 15 and a fuel filter 16 to a fixed displacement second stage pump, indicated generally at 21 forming the second stage of the fuel control. An additional cooler 18 is connected into the fluid line 12 for return of a portion of the fuel through a fluid line 19 to the first boost stage 10. The fuel pumped by the second stage pump 21 flows through fluid lines 22 and 23 to the engine fuel control (not shown). Additional conventional components of the engine fuel system include a filter bypass valve 24 and a relief valve 25 set to open at a predetermined pressure value.

When the fuel delivered to the engine fuel control exceeds that demanded under the then-existing operation conditions, there is a bypass of fuel from the fuel control and return thereof through a line 30 to the fluid line 12 downstream of the first boost stage 10. Additionally, fuel is returned by way of fuel control servo leakage through a fluid line 31 to the fluid line 12 ahead of the second stage pump 21. As shown in FIG. 1, the fluid line 31 is, in part, defined by a hollow impeller shaft, as more particularly described hereinafter, and with arrows showing portions of this flow used for lubrication. An added fluid line 32 extends between the fluid lines 22 and 31 whereby bearing leakage within the second stage pump 21 can be returned to the pump inlet.

Figure 2:
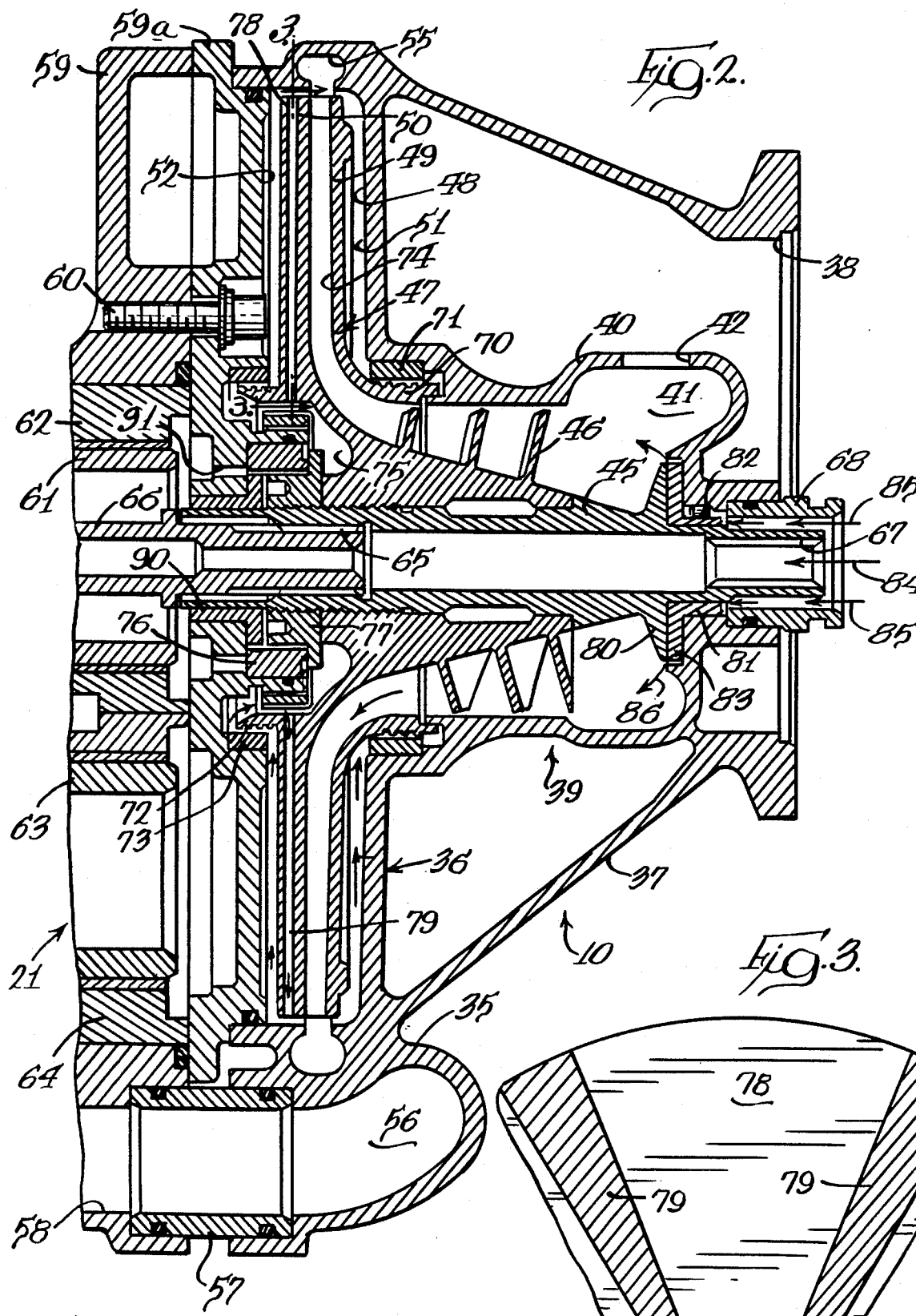
FIG. 2 is a vertical central section through a portion of the two-stage pump of the fuel control system.

The first boost stage centrifugal pump is shown in FIG. 2 along with a portion of the second stage pump 21.

A volute casing 35 houses an impeller stage, indicated generally at 36. An integral casing section 37 has an inlet 38 connected to the inlet line 11 for the pump. The casing has an inducer section 39 with an internal wall 40 defining a fluid chamber 41. Fluid reaches the fluid chamber 41 through an opening 42 in the internal wall 40.

An impeller shaft 45 extends lengthwise of the casing and mounts a spiral-bladed inducer 46 in the inducer section 39 and an impeller 47 in the impeller stage 36. The impeller 47 is mounted in an impeller cavity 48 within the casing and has a front shroud 49 and a rear shroud 50 spaced from surfaces 51 and 52 of the impeller cavity walls, respectively, to provide cavity spaces at both the front and rear of the impeller.

The volute casing has a volute entrance 55 surrounding the impeller 47 which enlarges to a discharge passage 56 which, through a tubular coupling 57, connects with a passage 58 in a housing 59 for the second stage pump. The housing 59 and a second 59a of the volute casing 35 are held in assembled relation as by threaded fastening members, one of which is shown at 60. The second stage pump 21 may be conventional and is only shown fragmentarily, and has a pair of meshing gear pump elements. One gear pump element has a hollow shaft 61 rotatably mounted in an annular lined bearing 62. The other gear pump element has a hollow shaft 63 rotatably mounted in an annular lined bearing 64.

The rear end of the impeller shaft 45 is internally splined at 65 to a shaft extension 66 which is connected by means such as a spline (not shown) to the gear pump element 61. The front end of the impeller shaft 45 is positioned within and spaced from a tubular coupling 68 fitted into the casing and has an internal spline 67.

A pair of annular labyrinth seals are associated with the impeller. The front labyrinth seal has a series of grooves 70 formed at the inner end of the front shroud 49 which coact with a ring 71 of suitable material, such as carbon, which is mounted in the casing. The rear labyrinth seal has a series of grooves 72 integral with the impeller to the rear of the rear shroud 50 and which coact with a ring 73 of suitable material mounted in the casing section 59a. For clarity, the space between the grooves and the rings has been shown enlarged while, in actual practice, these components would be closely spaced together.

The impeller is preferably cast with a series of spiral channels 74 between the front and rear shrouds whereby rotation of the impeller delivers fuel under pressure to the volute entrance 55. This fuel under pressure communicates with the front and rear cavity spaces and the labyrinth seals.

Figure 3:
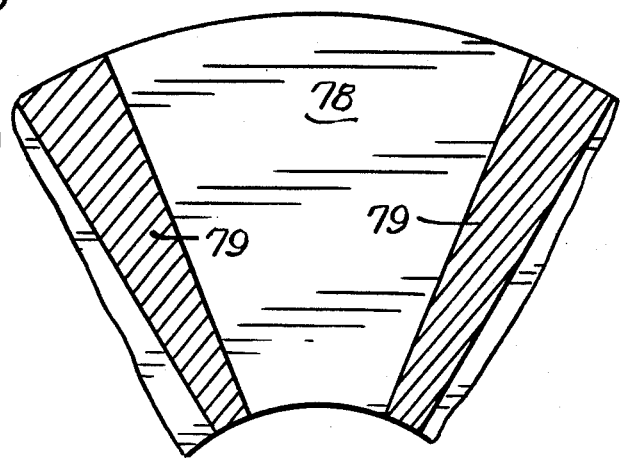
FIG. 3 is a fragmentary vertical section taken generally along the line 3—3 in FIG. 2.

A space 75 radially inward of the rear labyrinth seal 72-73 and to the rear of the rear shroud 50 is substantially sealed from the impeller shaft by a ring seal 76 urged against a plate 77. In order to minimize bearing thrust loads resulting from pressure forces acting within the substantially sealed space 75, fuel must be drawn from this space. This is accomplished without the fuel flowing to a low pressure area within the pump by means of pumping means associated with the impeller. More particularly, this pumping means is a shrouded secondary pump mounted at the rear of the impeller. This pump includes a plate 78 spaced from the rear shroud 50 of the impeller and with a series of radially-extending pumping ribs 79 positioned therebetween as shown in FIG. 3. The components of the secondary pump may be cast integrally with the impeller. The secondary pump has an inlet communicating with the substantally enclosed space 75 and a discharge end at the outer periphery of the impeller and communicating with the volute entrance 55 whereby the pumped fluid enters a relatively high pressure area and, thus, does not enter into the centrifugal pump in a low pressure area where it could adversely affect operation of the pump.

The impeller shaft 45 has a front thrust bearing 80 adjacent the front end thereof which is a generally planar member and which coacts with a journal bearing 81. The journal bearing 81 has a tubular section rotatably mounting the impeller shaft and a planar section 83 facing the front thrust bearing 80. As previously mentioned, the impeller shaft 45 is hollow and fuel flow can enter the interior thereof from line 31 as shown in FIG. 1 and as indicated by an arrow 84 in FIG. 2. A part of this fuel flow, as indicated by arrows 85, lubricates the journal bearing 81 and the thrust bearing 80, with this lubricating fuel entering the fluid chamber 41 of the inducer section 39, as indicated by the arrow 86. The amount of leakage indicated by arrow 86 is controlled and limited to a minimum value necessary for lubrication by insuring a minimal forward thrust on the impeller shaft 45. This is accomplished by a slight "overbalance" between the front labyrinth seal 70-71 and the rear labyrinth seal 72-73. More particularly, the rear labyrinth seal 72-73 is slightly closer to the axis of rotation of the impeller shaft than the front labyrinth seal 70-71 whereby a greater area at the rear of the impeller is exposed to fluid pressure to result in an imbalance of pressure forces acting to exert a forward thrust on the impeller shaft 45.

Flow through the hollow impeller shaft 45 also lubricates the splines 65 and 67 and the flow leaving the spline 65 is in a centrifugal force field whereby there is a lubricating flow between a rear thrust and journal bearing 90, the housing section 59a and the impeller shaft 45. This flow discharges through openings 91 in the casing section 59a. This leakage flow path is isolated from the substantially sealed space 75 behind the impeller by the ring seal 76 previously referred to whereby the high temperature lubricating flows are not pumped to the volute entrance to increase the temperature of fuel at the pump discharge. This assists in holding down the temperature of fuel which leaks past the front labyrinth seal to a low pressure inlet area.

In a fuel system for an aircraft engine, it is possible to have fuel returning to the pump stages in the range of 300° F. It is essential to minimize the discharge of this high temperature fuel into areas of low pressure of the system. This minimizes vapor formation in areas of low pressure, thus improving the net positive suction head performance of the centrifugal pump. This has been accomplished, while reducing the moments and resultant loads imposed on journal and thrust bearing surfaces, by discharging trapped fuel from behind the impeller to the volute entrance of the centrifugal pump which is at a relatively high pressure and by controlling leakage through the bearings by relating the location of the labyrinth seals to provide minimal forward thrust on the impeller shaft and with the labyrinth seals being on diameters located close to the axis of rotation of the impeller shaft to reduce the moments imposed on the bearing surfaces.

The invention is described in reference to an engine fuel control system. However, it will be obvious to those skilled in the art that the invention is applicable to handling of other fluids and, therefore, reference to "fuel" in the description is not intended to limit the invention. In addition, the invention is applicable to any centrifugal pump with one or more stages and with or without a second stage fixed displacement pump.

What is claimed is:

1. In a closed loop aircraft engine fuel system, a centrifugal pump having a casing, an impeller stage and an inducer section; a hollow impeller shaft rotatably mounted in said casing and having a spiral-bladed inducer located in a fluid chamber of the inducer section; and an impeller with front and rear shrouds located in an impeller cavity of the casing and spaced from the adjacent walls of the impeller cavity; a front end of the impeller shaft having a planar thrust bearing positioned in said fluid chamber; a journal bearing mounted in said casing and having a tubular section for rotatably mounting said front end of the impeller shaft and a planar section for coaction with said planar thrust bearing; said tubular and planar sections of the journal bearing being lubricated by fuel flowing toward said hollow impeller shaft; front and rear labyrinth seals associated one with each of said impeller front and rear shrouds and the casing and located near the inner ends of the shrouds and at different distances from the axis of rotation of the impeller shaft, said front labyrinth seal surrounding and opening to the downstream end of the spiral-bladed inducer to have fuel leakage therethrough return to the fuel being supplied to the impeller at a location circumferentially outward of the inducer and where the supplied fuel is at an elevated pressure; said casing having a volute with a volute entrance surrounding the outer periphery of the impeller; an additional seal positioned inwardly of the rear labyrinth seal to substantially seal a space behind the innermost part of the rear shroud; and means for pumping fuel from said substantially sealed space to the volute entrance, said means for pumping fuel from said substantially sealed space comprising, a shrouded secondary pump having a plate fixed to and spaced from said rear shroud with pumping ribs therebetween and having an inlet communicating with said substantially sealed space; said rear labyrinth seal being to the rear of said plate and said plate being spaced from the adjacent wall of the impeller cavity whereby there is a part of the impeller cavity to the rear of said plate which communicates with the volute entrance and is out of direct communication with said substantially sealed space; said volute entrance also communicating with the space between the front impeller shroud and adjacent impeller cavity wall whereby an imbalance of pressure forces acting on the rear of said plate and the front impeller shroud urges the planar thrust bearing toward the journal bearing planar section.

2. A centrifugal pump in a closed loop fuel supply system for an aircraft engine and having a casing with an impeller cavity, an impeller shaft rotatable in said casing, an impeller on said impeller shaft in said impeller cavity and having front and rear shrouds spaced from the adjacent walls of the impeller cavity to define front and rear open cavity spaces, respectively, front and rear labyrinth seals associated one with each of said impeller front and rear shrouds and the casing and located near the inner ends of the shrouds and communicating with said open cavity spaces, said casing having a volute with a volute entrance surrounding the outer periphery of the impeller and which communicates with the open cavity spaces between the impeller shrouds and adjacent casing walls, an additional seal positioned radially inward of the rear labyrinth seal to substantially seal a space behind the innermost part of the rear shroud and which communicates with the rear labyrinth seal, means for pumping fluid from said substantially sealed space to the volute entrance, said means for pumping fluid from said substantially sealed space comprising, a shrouded secondary pump in said rear open cavity sapce and having a plate fixed to and spaced from said rear shroud with pumping ribs therebetween and having an inlet communicating with said substantially sealed space, said rear labyrinth seal being to the rear of said plate and said plate being spaced from the adjacent wall of the impeller cavity whereby there is a part of the rear open cavity space to the rear of said plate which communicates with the volute entrance and is out of direct communication with said substantially sealed space, a lubricated journal bearing in said casing rotatably mounting a front end of the impeller shaft and lubricated by fuel flowing to the impeller, a planar front thrust bearing on said impeller shaft, the rear labyrinth seal being closer to the axis of rotation of the impeller shaft than the front labyrinth seal whereby an imbalance of forces from fluid pressure in said open cavity spaces acting in opposition on said front shroud and said plate of the shrouded secondary pump urges said planar front thrust bearing toward said journal bearing to control the lubricating fuel flow, and said casing having an inducer section, a spiral-bladed inducer on the impeller shaft in said inducer section, and said front labyrinth seal surrounding and opening to the space surrounding the downstream end of the spiral-bladed inducer whereby fuel leakage through the front labyrinth seal will be exposed to fuel at an elevated pressure.

* * * * *